United States Patent [19]

Yaniger et al.

[11] Patent Number: 4,851,487

[45] Date of Patent: Jul. 25, 1989

[54] CONDUCTIVE POLYMER MATERIALS AND METHOD OF PRODUCING SAME

[75] Inventors: Stuart I. Yaniger, Ventura; Randy E. Cameron, Pacific Palisades, both of Calif.

[73] Assignee: Lockheed Corporation, Calabasas, Calif.

[21] Appl. No.: 158,477

[22] Filed: Feb. 22, 1988

[51] Int. Cl.$^4$ .................. C08L 79/02; H01B 1/00; H01B 1/06
[52] U.S. Cl. ...................... 525/540; 252/500; 252/511; 528/332; 528/391; 528/422
[58] Field of Search ............... 525/540; 252/500, 518, 252/511; 528/332, 391, 422

[56] References Cited

U.S. PATENT DOCUMENTS

| | | | |
|---|---|---|---|
| 4,025,463 | 5/1977 | Trevoy | 252/500 |
| 4,556,623 | 12/1985 | Tamura et al. | 730/8 |
| 4,615,829 | 10/1986 | Tamura et al. | 252/500 |
| 4,731,408 | 3/1988 | Jasne | 524/516 |
| 4,798,685 | 7/1989 | Yaniger | 252/500 |

FOREIGN PATENT DOCUMENTS 1519729 2/1968 France.

OTHER PUBLICATIONS

A. G. MacDiarmid et al., Mol. Cryst. Liq. Cryst., 121, 173 (1985).

*Primary Examiner*—Allan M. Lieberman
*Attorney, Agent, or Firm*—Max Geldin

[57] ABSTRACT

Production of base-type conductive polymers, particularly from the family of conductive polyaniline, by reacting a base-type non-conductive polymer containing carbon-nitrogen linkages, e.g., polyaniline, with an anhydride, such as R—SO$_2$—O—SO$_2$—R', R—CO—O—CO—R', or R—CO—O—SO$_2$R', or mixtures thereof, where R and R' are alkyl or aryl, e.g., tosylic anhydride or benzophenone tetracarboxylic dianhydride, and forming an electrically conductive polymer in which the SO$_2$R and COR groups are covalently linked to the nitrogen atoms of the conductive polymer and the anion of the conductive polymer is the SO$_3$R' or O$_2$CR' group.

21 Claims, No Drawings

CONDUCTIVE POLYMER MATERIALS AND METHOD OF PRODUCING SAME

BACKGROUND OF THE INVENTION

This invention relates to the production of electrically conductive polymer materials and is particularly concerned with the production of such materials exhibiting improved mechanical properties, processability, and thermal and environmental stability, and with procedure for producing same.

The free-base form of polyaniline is believed to comprise subunits having the formula:

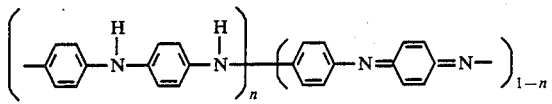

where n is between and 0 and 1. The oxidation state of polyaniline referred to as "emeraldine" is believed to have a value of n of about 0.5.

The free-base form of polyaniline is electrically non-conductive. Protonic acid doping of polyaniline by reaction of polyaniline with a protonic acid HX where X is, for example, Cl, to produce electrically conductive polyaniline is known, for example, as disclosed in A. G. MacDiarmid, et al, Mol. Cryst. Liq. Cryst. 121, 173 (1985). Conductive polyaniline of this type has been employed in batteries, as disclosed, for example, in French Pat. No. 1,519,729.

However, a number of difficulties have been encountered with the prior art materials noted above. Thus, the conductive polyaniline acid salts are, with a few exceptions, insoluble in most solvent media. None of the polyanilines can be melted. The emeraldine free-base and the conductive forms thereof noted above tend to form powders on removal of the solvent. With some effort, films can be cast; however, they are quite fragile and brittle, easily crumbling to form a powder. The conductive acid salts lose their conductivity when exposed to liquid water. This loss is due to deprotonation. The conductivity loss is reversible; treatment of the deprotonated material with protic acids restores the conductivity. Further, conductive regions in an insulating matrix tend toward diffusion. For example, if one makes a conductive trace of polyaniline acid salt on a substrate of emeralidine free-base, the trace remains spatially stable for only a short time, eventually spreading out until the substrate has a constant conductivity throughout.

Some of these problems were addressed in U.S. Applications Ser. No. 920,474 filed Oct. 20, 1986, now U.S. Pat. No. 4,798,685, of S. I. Yaniger, and Serial No. 013,305 filed Feb. 11, 1987, now U.S. Pat. No. 4,806,271, of S. I. Yaniger, et al, both assigned to the same assignee as the present application. In these applications, it is disclosed that Lewis acids, for example, alkylating agents, can be used to make the insulating emeraldine free-base into a conductive polymer salt. Use of proper Lewis acids resulted in conductive polyanilines with the Lewis acid as a sidechain. These derivatized polyanilines are more water stable and processable than the prior art emeraldine acid salts. Additionally, no diffusion between "doped" conducting and "undoped" insulating regions was observed.

Thus, in the above U. S. application, Ser. No. 920,474, a base-type non-conductive polymer, such as polyaniline, can be reacted with, for example, methyl iodide, to form an electrically conductive polymer in which the methyl group is covalently linked to the nitrogen atoms of the polymer.

In the above U.S. application, Ser. No. 013,305, emeraldine free-base can be reacted with reagents of the form $RSO_2Cl$, e.g., tosyl chloride, to form an electrically conductive polymer in which the $—SO_2R$ groups are covalently linked to the nitrogen atoms of the polymer.

In general, however, the conductive polymers of the above applications do not form consistently good films. Attempts to cast films by removal of solvent from polymer solutions generally yield powders or extremely brittle, fragile films.

Additionally, polymers of the above applications exhibit loss of conductivity when exposed to high temperatures. For example, the conductive polymer produced by emeraldine free-base treated with tosyl chloride (conductivity =1.0 S/cm) loses its conductivity when heated to 150° C. for one hour. The thermal instability results from interaction of the relatively nucleophilic chloride counterion with the polymer backbone.

An object of the present invention is the provision of improved base-type electrically conducting polymers of the class of conductive polyaniline.

Another object is to provide conductive polymers, such as conductive polyaniline, having thermally stable counterions in the conductive polymer system.

A further object of the invention is the provision of conductive nitrogen-containing polymers having bulky side chains bound to nitrogen atoms of the polymer.

Still another object is the provision of a conductive base-type polymer of the above type, such as conductive polyaniline, having improved mechanical properties and processability.

Yet another object is to provide novel procedure for producing the above conductive polymers.

SUMMARY OF THE INVENTION

The above objects are achieved, according to the invention, by the Lewis acid doping of base-type non-conductive polymers, particularly from the family of the polyanilines, to produce electrically conductive polymers, by reacting a base-type non-conductive polymer containing carbon-nitrogen linkages with an anhydride having an organic or inorganic group capable of covalently binding to the nitrogens of the polymer, such as tosylic anhydride or 3,3′,4,4′-benzophenone tetracarboxylic dianhydride (BTDA) and forming an electrically conductive polymer in which such groups are linked to the nitrogen atoms of the polymer.

Thus, base-type non-conductive polymers, particularly as represented by the free-base polyaniline, or emeraldine, can be reacted with a cation anhydride donor compound, hereinafter termed the "B+ donor compound", and which can be a sulfonic anhydride, a carbonyl anhydride, or a carbonyl sulfonic anhydride, or mixtures thereof, such as $R—SO_2—O—SO_2R′$, $R—CO—O—CO—R′$, or $R—CO—O—SO_2R′$, or mixtures thereof, where R and R′ are each an organic group, as defined below, to form a polymer salt in which a covalent bond is formed between a nitrogen of the polymer and the $—SO_2R$ group when the reactant is $R—SO_2—O—SO_2—R$; and between the nitrogen and the $—COR$ group, when the reactant is $R—CO—O—$ CO—R' or R—CO—O—SO₂R'. The counterions of the above polymer salts are the chemically and thermally stable —SO₃R' and the —O₂CR' anions, respectively. Thus, the term "base-type conductive" polymers employed herein is intended to denote the polymer salts formed by the above reaction.

Thus, where a sulfonic anhydride, such as tosylic anhydride, is reacted with the base-type non-conductive polymer, such as polyaniline, the polymer counterion or anion, the —SO₃R' group, e.g., tosylate anion, —SO₃C₆H₄CH₃, is less reactive than, for example, where the anion is a halogen, such as chloride, as when employing tosyl chloride, and does not tend to react with the polymer chain or backbone. The result is a more thermally stable conducting polymer.

When the anhydride employed is a carbonyl anhydride of the type of dianhydrides used in the production of polyimides, such as pyromellitic dianhydride or BTDA, this results in the covalent attachment of bulky side chains —COR to the polymer backbone, and a bulky —O₂CR' polymer counterion. Conducting polymers produced in this manner are soluble in a wide range of organic solvents and form tough films. It is not known whether dianhydrides, such as BTDA, form cross-links between polymer chains.

If desired, a combination of sulfonic and carbonyl anhydrides can be reacted with the non-conductive polymer to tailor the resulting conductive polymer with respect to the desired electrical conductivity and other properties, such as solubility, thermal stability, and mechanical integrity.

The conductive polymers, e.g., conductive polyaniline, produced according to the invention process provide an improved film, have good electrical conductivity, improved thermal stability and, depending on the R and R' groups, have enhanced processability and good mechanical properties.

DETAILED DESCRIPTION OF THE INVENTION AND PREFERRED EMBODIMENTS

The base-type conductive polymers of the invention are prepared by the reaction of a base-type non-conductive polymer containing the carbon-nitrogen linkage with a B+ donor material in the form of an anhydride, as defined above, that accepts electrons to form a covalent chemical bond with the polymer and provides counterions, noted above. The reaction for producing the electrically conductive organic polymers of the invention can be represented as follows:

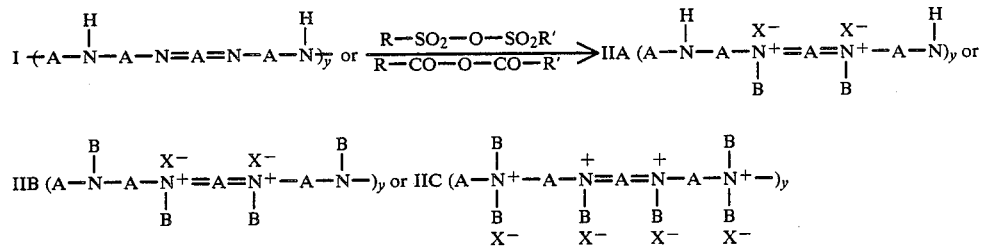

where A is an unsaturated carbon-containing group, such as aryl, particularly the benzene ring, as in polyaniline, and including naphthyl and biphenyl, and substituted benzene, naphthyl or biphenyl groups, such as the alkyl substituted derivatives, e.g., 2-methyl biphenyl, butyl naphthalene, 2-methyl aniline, and aryl substituted derivatives, e.g., beta phenyl naphthalene and beta tolyl naphthalene; B is a group which readily forms a covalent bond with nitrogen, and which can be —SO₂R or —COR, and X is the anion SO₃R'⁻ or O₂CR'⁻, where R and R' can be alkyl, e.g., containing 1 to 20 carbon atoms, such as methyl, ethyl and the like, and particularly aryl, e.g., benzyl, tolyl and xylyl, and other aromatic moieties; and y is an integer ranging from about 1 to about 1,000, e.g., about 10 to about 100. When y is in the low end of the above range, e.g., when y is 1 or 2, the materials are known as oligomers and are intended to be included within the term "polymer" employed herein. The polymer in its conductive form can be of form IIa, IIb or IIc above, or any combination of these forms.

The preferred non-conductive polymer employed as the basic polymeric starting material is polyaniline emeraldine free-base (PFB).

Thus, if the reaction is carried out using R—SO₂—O—SO₂R' as the B+ donor compound, the organic cation B, the —SO₂R group, is covalently linked to the N atoms of the polymer through the S atom of such group, and where R—CO—O—CO—R' or R—CO—O—SO₂R' is employed, the organic cation B, the —COR group is covalently linked to the nitrogens through the carbon atom of such group, forming a carbon-nitrogen bond at the carbonyl site. X are the stable anions —SO₃R' and —O₂CR', respectively.

The reaction of base-type non-conductive polyaniline, where A is polymer I above is benzene, with tosylic anhydride, can be represented schematically as follows, the B group in the resulting conductive polymer being the SO₂C₆H₄CH₃ group, and X being the SO₃C₆H₄CH₃ group:

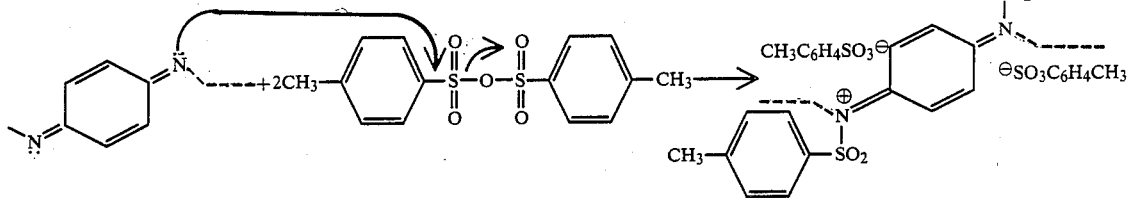

Where the reaction with non-conductive polyaniline is carried out with a carbonyl anhydride R—CO—O—CO—R', such as the dianhydride BTDA having the formula noted below:

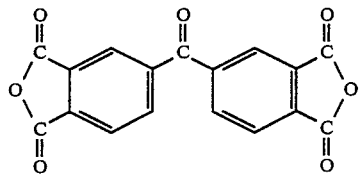

the general reaction can be represented schematically as follows:

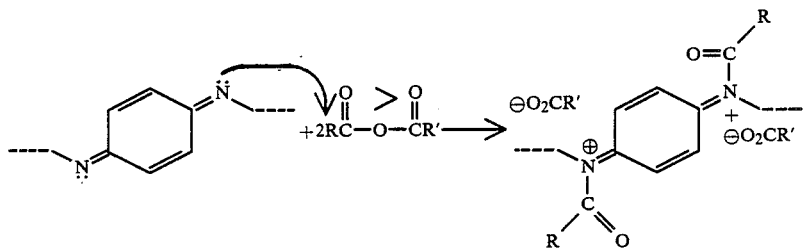

In the case of BTDA above, it is an anhydride group at either end of this material which opens up and attaches to the nitrogen of the polymer to form the —COR groups, the remainder of the molecule forming the —O$_2$CR' group.

In place of polyaniline containing phenyl groups, as noted above, there can be employed other non-conductive base-type polymeric starting materials of the polyaniline family, containing naphthalene or biphenyl groups, the resulting conductive polymers thus produced according to the invention being analogous base-type conductive polymers containing naphthyl or biphenyl groups, respectively, and wherein the B groups are covalently linked to nitrogen. Such polymeric starting materials can include other non-conductive base-type polymers containing carbon atoms linked to nitrogen, such as cyanogen polymer containing the recurring unit:

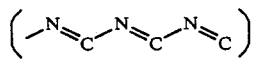

The starting materials of the invention can also include non-conductive mixtures and blends of the above polymers, and copolymers of the above polymers and other polymers, such as a blend of polyaniline and polymethylmethacrylate, and polymer alloys, such as polybenzimidazolepolyimide alloys, containing carbon-nitrogen groups.

Thus, the term "non-conductive polymer" as employed herein is intended to denote any of the above homopolymer or copolymer materials.

The invention will be described hereinafter, however, mostly in terms of the use of the preferred non-conductive free-base polyaniline as polymeric starting material for reaction with an anhydride for production of the preferred highly conductive polyanilne described above.

In carrying out the reaction, the polyaniline free-base is treated with the B$^+$ anhydride donor compound, such as R—SO$_2$—O—SO$_2$—R' or R—CO—O—CO—R', where R and R' have the definitions noted above. Thus, the B$^+$ donor compound can be, for example, one of the above compounds, such as tosylic anhydride, trifluoromethane sulfonic anhydride. 3,3',4,4'-benzophenone tetracarboxylic dianhydride (BTDA), pyromellitic dianhydride, nadic anhydride (4-Norbornene-2,3-dicarboxylic anhydride), methane sulfonic anhydride, benzene sulfonic anhydride, maleic anhydride and 2-sulfobenzoic anhydride.

If desired, a combination of sulfonic and carbonyl anhydrides can be reacted with the non-conductive polymer. Thus, for example, non-conductive polyanilne can be reacted with a mixture of tosylic anhydride and BTDA, in order to tailor the properties of the resulting conductive polymer, e.g., so as to have a desired electrical conductivity, together with high thermal stability and good mechanical properties, such as toughness.

Also, an oligomer or polymer containing anhydride groups can be reacted with a non-conductive polymer, such as polyaniline, to produce a conductive polymer. Thus, for example, a polyimide oligomer terminated by anhydrides and termed herein 6FDA/APB can be employed. This material has the structure noted below:

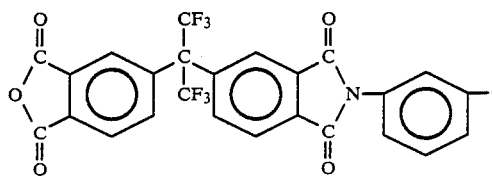 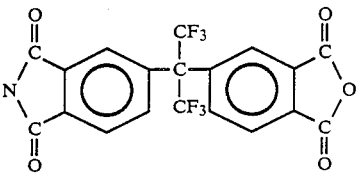

The molar proportions of B+ anhydride donor compound to non-conductive nitrogen-containing polymer free-base can range from about 0.01 to about two $SO_2R^+$ or $COR^+$ groups per nitrogen. In the case of polyaniline, such molar proportions can range from about 0.01 to about 8, per polymer repeat unit.

The reaction can be carried out as a heterogeneous reaction wherein the polymer starting material is not dissolved but is reacted directly with the anhydride, or the polymer starting material, such as polyaniline nonconductive free-base, can be dissolved in a suitable solvent which does not react irreversibly with the anhydride, e.g., N-methyl pyrrolidone, dimethylsulfoxide (DMSO), dimethylformamide (DMF), dimethylacetamide (DMAC), acetonitrile and pyridine.

The reaction is generally carried out at about ambient or room temperature, e.g., 20°–25° C., or higher or lower temperatures.

The rate of reaction can range widely, depending on the particular anhydride reactant employed. Thus, the reaction rate can range from almost instantaneous to several hours or longer.

In the case of polyaniline free-base, this is a high polymer having a molecular weight of the order of 50,000 to 80,000. Lower molecular weight forms of polyanilne can also be employed, such as an oligomer of polyaniline containing 8 aniline monomer units and having a molecular weight of about 800 to 900. When the free-base is reacted with the "B+" anhydride donor, for example, $R-SO_2-O-SO_2R'$, the R group thereof can be substituted for every nitrogen bound hydrogen on the polymeric chain to form the conductive polymer, as represented by Formula IIB above. Further reaction results in all amine-like nitrogens forming quaternary ammonium groups, as illustrated by Formula IIC above. However, the number of covalently bound $SO_2R$ or COR groups on the polymer can be controlled by interrupting the reaction at a predetermined time prior to substitution of all of the hydrogen atoms on the polymer with such groups, as illustrated by Formula IIA above.

The resulting conductive polymer has high conductivity, e.g., 10 to 15 orders of magnitude higher than most organic polymers. Thus, the conductivity of the invention polymers can be about equal to the value of the conductivity reported for the protonic acid doped polyaniline of the prior art. The conductivity of the invention polymers, e.g., conductive polyaniline, can be varied by reducing or increasing the number of covalently linked B groups, as by controlling the degree of completeness of the reaction, the conductivity increasing with increase in the number of covalently linked B groups up to a certain number and then subsequently decreasing with an increasing number of B groups. The conductivity can also be varied by changing the oxidation state, i.e., the relative number of amine and imine groups.

The physical properties of the highly conductive polymer produced according to the invention can be varied, for example, so as to enhance the thermal stability and processability of the polymer. Thus, for example, one can vary the chain length of an alkyl group R in the "B+" anydride donor compounds to increase the solubility of the polymer. This permits the casting of a film of the conductive polymer on a substrate and permits control of the mechanical properties, such as ductility of the polymer.

The following are examples of practice of the invention:

EXAMPLE 1

Six grams of emeralidine free-base were dissolved in 250 ml of pyridine. Tosylic anhydride (0.5 equivalent per emeralidine nitrogen) was added. The reaction mixture was allowed to stir for 72 hours at room temperature. The pyridine solvent was then removed by means of a rotary evaporator. The resulting polymer had a conductivity of 0.5 S/cm and remained electrically conductive after one hour at 150° C.

EXAMPLE 2

The same procedure as in Example 1 was carried out, but using trifuloromethane sulfonic anhydride in place of tosylic anhydride, and in the same proportion thereof. The resulting polymer had an electrical conductivity of 1.0 S/cm.

EXAMPLE 3

Six grams of emeraldine free-base were dissolved in N-methylpyrrolidinone (NMP). ¼ equivalent of BTDA per nitrogen of the polyaniline was added, and the mixture was stirred for 4 hours at room temperature. The resulting polymer had an electrical conductivity of $9.1 \times 10^{-5}$ S/cm and formed a tough, cohesive coating when the solvent was removed by heating.

EXAMPLE 4

Emeraldine free-base (6 grams) was dissolved in 250 ml of NMP. ¼ equivalent 6FDA/APB dianhydride per emeraldine nitrogen, a polyimide oligomer terminated by anhydrides, was added, and the reaction was allowed to proceed at room temperature for 24 hours. A conductive polymer having an electrical conductivity of $6.3 \times 10^{-5}$ S/cm was obtained.

EXAMPLE 5

0.3 grams of emeraldine free-base were dissolved in N-methylpyrrolidone (NMP). ¼ equivalent of pyromellitic dianhydride per emeralidine nitrogen was added, and the mixture was stirred for 4 hours at room temperature. The resulting polymer was green and had an electrical conductivity of $3.3 \times 10^{-4}$ S/cm and formed a tough, cohesive coating when the solvent was removed by heating.

EXAMPLE 6

0.3 grams of emeraldine free-base were dissolved in N-methylpyrrolidone (NMP). ¼ equivalent of maleic anhydride per emeraldine nitrogen was added, and the mixture was stirred for 4 hours at room temperature. The resulting polymer had an electrical conductivity of $1.0 \times 10^{-4}$ S/cm and formed a tough, cohesive green coating when the solvent was removed by heating.

EXAMPLE 7

0.3 grams of emeraldine free-base were dissolved in N-methylpyrrolidone (NMP). ¼ equivalent of nadic anhydride per emeralidine nitrogen was added, and the mixture was stirred for 4 hours at room temperature. The resulting polymer had an electrical conductivity of $1.6 \times 10^{-5}$ S/cm and formed a tough, cohesive green coating when the solvent was removed by heating.

The base-type electrically conductive polymers of the invention have utility in the production of conductive composites, electronic components, electrical conductors, electrodes, batteries, switches, electrical shielding material, resistors, capacitors, and the like.

From the foregoing, it is seen that the invention provides a class of novel conductive polymer materials prepared by reacting an organic anhydride, including sulfonic and carboxylic anhydrides, with a non-conductive polymer, e.g., base-type polymers, such as polyaniline. The resulting conductive polymers have improved thermal stability, can be readily cast from a solvent to form good films, and have improved mechanical properties.

While particular embodiments of the invention have been described for purposes of illustration, it will be understood that various changes and modifications within the spirit of the invention can be made, and the invention is not to be taken as limited except by the scope of the appended claims.

What is claimed is:

1. A process for producing a conductive polymer which comprises reacting a base-type non-conductive polymer containing carbon-nitrogen linkages with an effective amount suficient to increase electrical conductivity of an anhydride having an organic group capable of being covalently linked to the nitrogen atoms of said polymer, said anhydride being selected from the group consisting of a sulfonic anhydride, a carbonyl anhydride, a carbonyl sulfonic anhydride, and mixtures thereof.

2. The process of claim 1, wherein said anhydride is selected from the group consisting of R—SO₂—O—SO₂—R', R—CO—O—CO—R', and R—CO—O—SO₂R', and mixtures thereof, where R and R' are each selected from the group consisting of alkyl and aryl.

3. The process of claim 2, said reaction taking place in a solvent which does not react irreversibly with said anhydride.

4. The process of claim 2, said base-type non-conductive polymer including homopolymer mixtures and blends, copolymers and polymer alloys, containing carbon-nitrogen groups.

5. The process of claim 2, wherein the base-type non-conductive polymer is selected from the group consisting of polyaniline, its naphthyl and biphenyl derivatives, and alkyl and aryl substituted polyaniline and its alkyl and aryl substituted naphthyl and biphenyl derivatives.

6. A process for producing a conductive polymer which comprises reacting a base-type non-conductive polymer having the general formula:

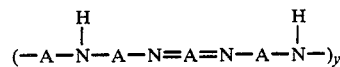

where A is an unsaturated carbon-containing group, with an effective amount sufficient to increase electrical conductivity of an anhydride selected from the group consisting of R—SO₂—O—SO₂—R', R—CO—O—CO—R' and R—CO—O—SO₂R', where R and R' are each selected from the group consisting of alkyl and aryl, and y is an integer ranging from about 1 to about 1,000, and forming an electrically conductive polymer having the general formula:

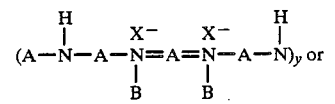

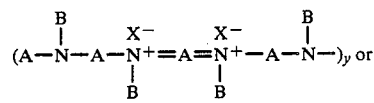

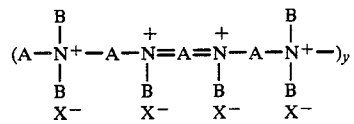

where B is a group selected from the class consisting of SO₂R and COR, and X is selected from the group consisting of SO₃R'⁻ and O₂CR'⁻.

7. The process of claim 6, wherein the base-type non-conductive polymer is selected from the group consisting of polyaniline, its naphthyl and biphenyl derivatives and alkyl and aryl substituted polyaniline and its alkyl and aryl substituted naphthyl and biphenyl derivatives.

8. The process of claim 6, the molar proportion of said anhydride to said non-conductive polymer ranging from about 0.01 to about two SO₂R⁺ or COR⁺ groups per nitrogen.

9. The process of claim 7, wherein said base-type non-conductive polymer is polyaniline.

10. The process of claim 9, wherein said anhydride is selected from the group consisting of tosylic anhydride, trifluoromethane sulfonic anhydride, pyromellitic dianhydride, 3,3',4,4'-benzophenone tetracarboxylic dianhydride, nadic anhydride, methane sulfonic anhydride, benzene sulfonic anhydride, maleic anhydride and 2-sulfobenzoic anhydride.

11. The process of claim 9, wherein said anhydride is a polyimide oligomer terminated by anhydrides.

12. The process of claim 9, the molar proportion of said anhydride to said polyaniline ranging from about 0.01 to about 8 per polymer repeat unit.

13. The process of claim 9, said reaction taking place in a solvent selected from the group consisting of N-methyl pyrrolidone, dimethylsulfoxide, dimethylformamide, diemthylacetomide, acetonitrile and pyridine.

14. An electrically conductive polymer comprising a base-type polymer containing carbon-nitrogen linkages having an organic or inorganic group covalently linked to nitrogen atoms of said polymer, said group selected from the class consisting of SO₂R and COR, where R is selected from the class consisting of alkyl and aryl.

15. The electrically conductive polymer of claim 14, having an anion associated therewith, said anion selected from the group consisting of $SO_3R'^-$ and $O_2CR'^-$, where R' is selected from the group consisting of alkyl and aryl.

16. The electrically conductive polymer of claim 15, wherein said base-type polymer is selected from the group consisting of polyaniline, its naphthyl and biphenyl derivatives, and alkyl and aryl substituted polyaniline and its alkyl and aryl substituted naphthyl and biphenyl derivatives.

17. An electrically conductive base-type polymer having the general formula:

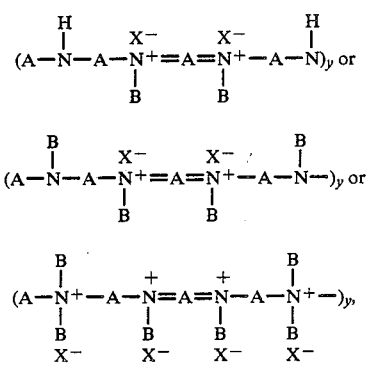

or an electrically conductive base-type polymer comprised of a combination of such formula structures, where A is an unsaturated carbon-containing group, B is a group selected from the class consisting of SO₂R and COR, X is selected from the group consisting of $SO_3R'^-$ and $O_2CR'^-$, where R and R' are each selected from the group consisting of alkyl and aryl, and y is an integer ranging from about 1 to about 1,000.

18. The electrically conductive polymer of claim 17, wherein the base-type polymer is selected from the group consisting of polyanilne, its naphthyl and biphenyl derivatives and alkyl and aryl substituted polyaniline and its alkyl and aryl substituted naphthyl and biphenyl derivatives.

19. An electrically conductive base-type polymer as defined in claim 18, wherein the base-type polymer is polyaniline, and said alkyl group contains from 1 to 2 carbon atoms.

20. An electrically conductive base-type polymer as defined in claim 19, where R and R' are each groups derived from a reactant selected from the class consisting of tosylic anhydride, trifluoromethane sulfonic anhydride, pyromellitic dianhydride, 3,3',4,4'-benzophenone tetracarboxylic dianhydride, nadic anhydride, methane sulfonic anhydride, benzene sulfonic anhydride, maleic anhydride, and 2-sulfonbenzoic anhydride.

21. The electrically conductive base-type polymer of claim 19, where y ranges from about 10 to about 100.

* * * * *